United States Patent [19]
Yanof et al.

[11] Patent Number: 5,371,778
[45] Date of Patent: Dec. 6, 1994

[54] CONCURRENT DISPLAY AND ADJUSTMENT OF 3D PROJECTION, CORONAL SLICE, SAGITTAL SLICE, AND TRANSVERSE SLICE IMAGES

[75] Inventors: Jeffrey H. Yanof, Solon; Rodney A. Mattson, Mentor; Paula I. Patel, Parma Hts., all of Ohio

[73] Assignee: Picker International, Inc., Highland Hts., Ohio

[21] Appl. No.: 800,242

[22] Filed: Nov. 29, 1991

[51] Int. Cl.$^5$ ................ G06F 15/42; G06F 15/62
[52] U.S. Cl. ................ 364/413.22; 378/901; 395/127
[58] Field of Search ............. 378/901; 395/119, 124, 395/127; 364/413.22, 413.13, 413.14

[56] References Cited

U.S. PATENT DOCUMENTS

| | | | |
|---|---|---|---|
| 4,259,725 | 3/1981 | Andrews et al. | 364/521 |
| 4,858,129 | 8/1989 | Mori | 364/413.14 |
| 4,882,679 | 11/1989 | Tuy et al. | 364/413.22 |
| 5,250,933 | 10/1993 | Beaudin et al. | 345/115 |

OTHER PUBLICATIONS

Fundamentals of Three–Dimensional Computer Graphics, Alan Watt Copyright 1989, Addison–Wesley Publishers Ltd. pp. 21–22; 2–6.

*Primary Examiner*—Paul M. Dzierzynski
*Assistant Examiner*—David V. Bruce
*Attorney, Agent, or Firm*—Fay, Sharpe, Beall, Fagan, Minnich & McKee

[57] ABSTRACT

A CT scanner (A) non-invasively examines a volumetric region of a subject and generates volumetric image data indicative thereof. An object memory (B) stores the data values corresponding to each voxel of the volume region. An affine transform algorithm (60) operates on the visible faces (24, 26, 28) of the volumetric region to translate the faces from object space to projections of the faces onto a viewing plane in image space. An operator control console (E) includes operator controls for selecting an angular orientation of a projection image of the volumetric region relative to a viewing plane, i.e. a plane of the video display (20). A cursor positioning trackball (90) inputs i- and j-coordinate locations in image space which are converted (92) into a cursor crosshair display (30) on the projection image (22). A depth dimension k between the viewing plane and the volumetric region in a viewing direction perpendicular to the viewing plane is determined (74). The (i,j,k) image space location of the cursor is operated upon by the reverse of the selected transform to identify a corresponding (x,y,z) cursor coordinate in object space. The cursor coordinate in object space is translated (100, 102,104) into corresponding addresses of the object memory for transverse, coronal, and sagittal planes (10, 12, 14) through the volumetric region.

20 Claims, 5 Drawing Sheets

CONCURRENT DISPLAY AND ADJUSTMENT OF 3D PROJECTION, CORONAL SLICE, SAGITTAL SLICE, AND TRANSVERSE SLICE IMAGES

BACKGROUND OF THE INVENTION

The present invention pertains to the image display art. It finds particular application in conjunction with the display of CT medical diagnostic images on video monitors and will be described with particular reference thereto. However, it is to be appreciated that the invention is also applicable to medical diagnostic images from magnetic resonance, nuclear, and other imaging modalities, to quality assurance and other three-dimensional, non-medical images, and the like. The invention is also applicable to hard copy displays, film image displays, and other display formats.

Heretofore, CT scanners have irradiated a planar region of a subject from various angles and detected the intensity of radiation passing therethrough. From the angle and radiation intensity information, two-dimensional image representations of the plane were reconstructed. A typical image representation included a 512×512 pixel array, although coarser and finer arrays are also known.

For three-dimensional imaging, the patient was moved along a longitudinal axis of the CT scanner either continuously for spiral scanning or incrementally, to generate a multiplicity of slices. The image data was reconstructed, extrapolating or interpolating as necessary, to generate CT numbers corresponding to each of a three-dimensional array of voxels. For simplicity of illustration, each of the CT numbers can be conceptualized as being addressable by its coordinate location along three orthogonal axes, e.g. x, y, and z-axes of the examined volume.

Typically, the volume data was displayed on the planar surface of a video monitor. Various planar representations of the volume data are now commonly available. Most commonly, the examined volume was a six sided prism with square or rectangular faces. The operator could select a display depicting any one of the six faces of the prism or any one of the slices through an interior of the prism along one of the (x,y), (x,z) or (y,z) planes. Some display formats also permitted oblique planes to be selected. Display formats were also available which permitted two or three sides of the prism to be displayed concurrently on a two-dimensional (i,j) image plane with appropriate visual cues to give the impression of a perspective view in three dimensions. That is, the visible faces were foreshortened (or extended) and transformed from rectangles to parallelograms by a sine or cosine value of an angle by which the viewing direction was changed. In this manner, each face of the prism was transformed into its projection along the viewing direction onto the viewing plane. This gives the faces the appearance of extending either parallel to the viewing plane or video monitor screen or extending away from the screen at an oblique angle. Some routines added shading to the view to give further visual cues of depth.

More specifically, the operator could typically cause a selected surface, such as a transverse (x,y) plane on the face (z=0) of the examined volume to be displayed. The operator could then cause a selected number of transverse planar slices to be peeled away or deleted by indexing along the z-axis (z=1,2,3, . . . ,n) to view the nth interior transverse planes. The operator could then position the cursor on the (x,y) or transverse plane to select a coronal or (x,z) plane. The selected coronal plane would then be displayed. The operator would then position the cursor on the displayed coronal plane to select a sagittal or (y,z) plane. Prior art medical image workstations commonly permitted the transverse, coronal, or sagittal planes or views to be displayed concurrently on the same screen. Some also permitted the three-dimensional projection image to be displayed concurrently as well.

One of the disadvantages of these prior art systems is that they did not permit simultaneous, interactive adjustment of the selected transverse, coronal, and sagittal planes. These prior art adjustments were commonly based on a two-dimensional reference plane which was always co-planar with the transverse, sagittal, or coronal planes, therefore restricting the sectioning cursor to two-dimensional movements. In the display format in which all three planes were displayed concurrently, the operator moved the cursor to one of the views, which then became the "active" view. By moving the cursor on the active view, the next planar slice could be reselected. By moving the cursor to the readjusted planar slice, the next slice could be readjusted. Thus, readjusting the displayed transverse, coronal, and sagittal views was sequential and, therefore, relatively slow and time consuming.

The present invention contemplates a new and improved method and apparatus for displaying images which permits concurrent, real-time readjustment of the transverse, coronal, and sagittal view displays by using a rotatable 3D object (or volume) and its projection view as a three-dimensional reference surface which allows the sectioning cursor to move in three dimensions.

SUMMARY OF THE INVENTION

In accordance with one aspect of the present invention, a volume object memory means is provided for holding data values indicative of each voxel of a volumetric region of the object. An affine transform means rotates, scales, and translates points, lines, and surfaces of the volumetric region (object space) into transformed points, lines, and surfaces of a 3D projection view when displayed on the pixels of a two-dimensional image plane or video display (image space). The transform means also supplies a reverse of the selected transform to transform the display pixels into corresponding locations of the object volumetric region. A video processor generates a video display of the data values that correspond to the reverse transformed locations in the volumetric region. An operator uses a cursor control means to move a cursor on the video display. The transform means also reversely transforms coordinates of the cursor from the image plane to a corresponding location in the volumetric region. A plane defining means defines orthogonal planes, preferably, transverse, coronal, and sagittal planes, which intersect the reversely transformed location in the volumetric region. The video processor means receives data values from the object memory lying along each of the planes and converts them into a corresponding video image. Preferably, the video processor converts the two-dimensional projection image representation and the planar images into images which are displayed concurrently in a common video display.

In accordance with another aspect of the present invention, a third image space coordinate is determined in accordance with a relative distance along the viewing direction from the screen pixel at the cursor to a point of intersection with a displayed voxel of the object.

One advantage of the present invention is that the relationship between the volume projection view and the transverse, coronal, and sagittal section (re-sliced) planes is maintained when the volume view is rotated for better visualization. These planes intersect at the cursor in both object and image space. The reverse transform between these spaces enables the planes to be updated correctly in object space regardless of the rotating (or view direction or orientation) of the volume projection view.

Another advantage of the present invention is that it permits interactive and simultaneous adjustment of the transverse, coronal, and sagittal planes.

Another advantage of the present invention is that it assists the operator in relating the position of the displayed transverse, sagittal, and coronal planes with their locations through a perspective type view of the volume.

Another advantage of the present invention is that it permits the operator to select the intersection point of the transverse, coronal, and sagittal planes in three dimensions in object space by using a cursor on a two-dimensional screen.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
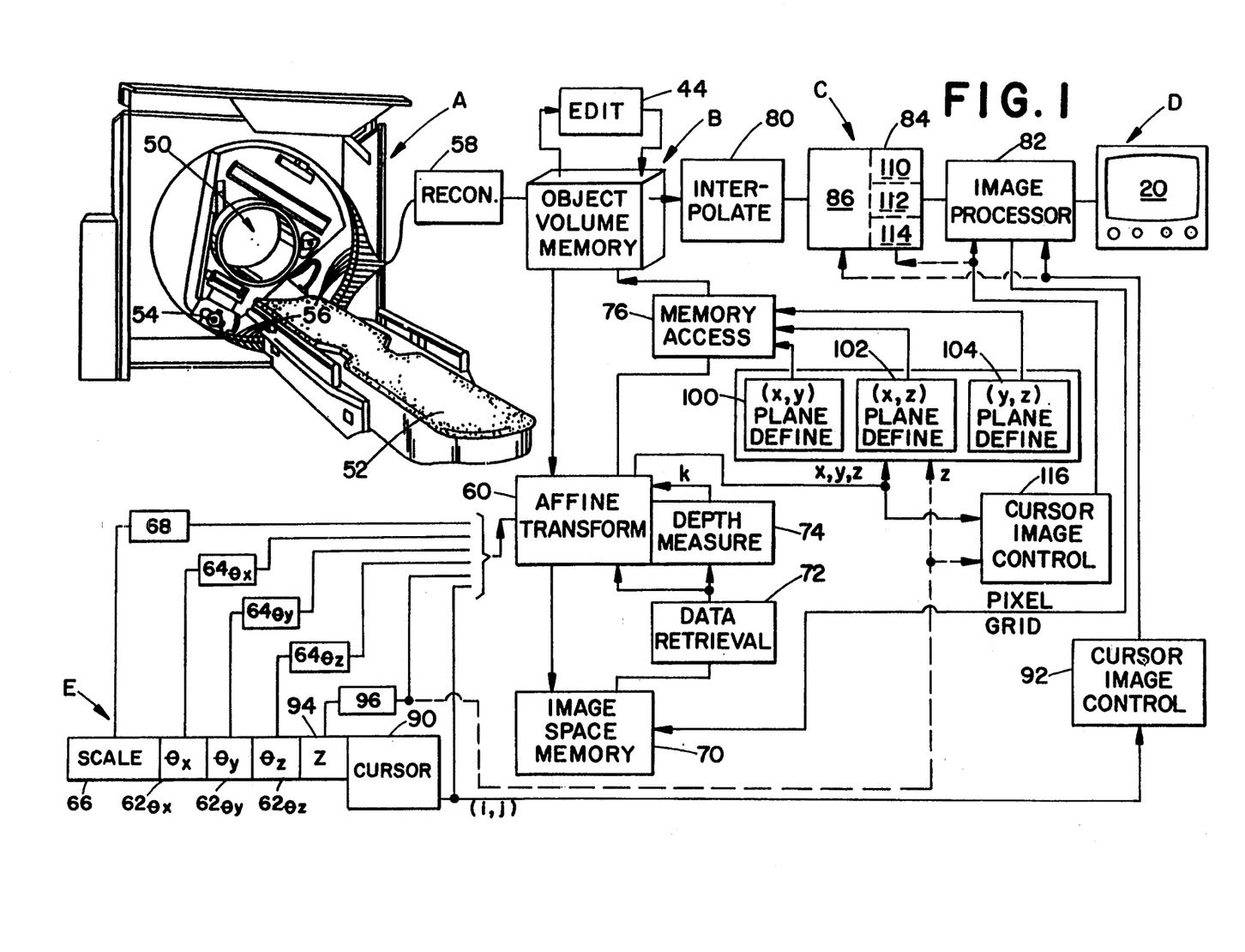
FIG. 1 is a diagrammatic illustration of an image data display system in accordance with the present invention.
Figure 2:
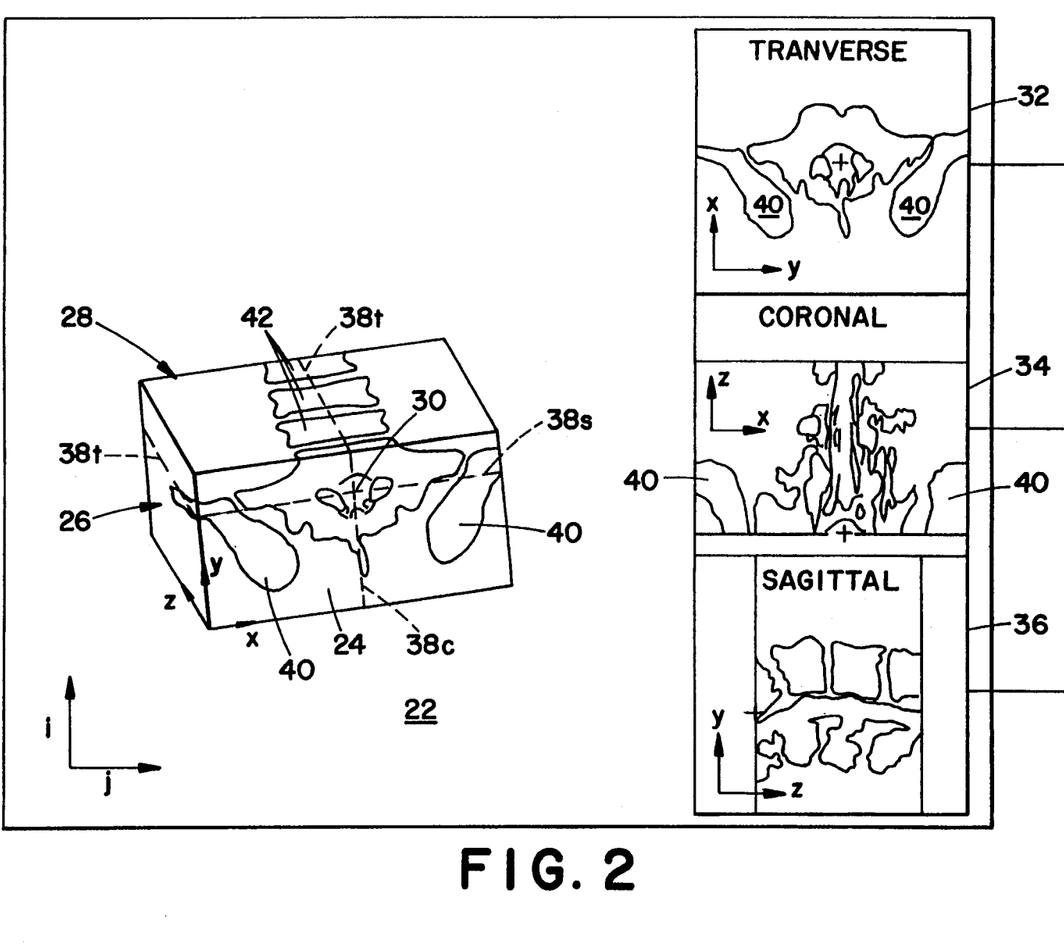
FIG. 2 is a diagrammatic illustration of a preferred video display generated by the present invention.

With reference to FIG. 1, a diagnostic imaging device A non-invasively examines a polyhedral volumetric region of a subject and generates a data value indicative of each voxel within the volumetric region. The data values corresponding to voxels of the polyhedron are stored in a three-dimensional object memory means B. The shape and size of the volumetric region is generally defined by the diagnostic imaging device. In the embodiment illustrated in FIG. 2, the region is illustrated as a rectangular prism, i.e. a six-sided volume having rectangular or square orthogonal faces. With continuing reference to FIG. 2 and further reference to FIG. 3, the volumetric region is defined by x, y, and z-coordinates which are defined in terms of a transverse plane 10, coronal plane 12, and sagittal plane 14 of a patient or other examined object. For each voxel within the polyhedral examined volumetric region, the imaging device A generates a data value, e.g. a CT number, which, for simplicity of illustration, is retrievable from the object memory B by addressing the object memory with the (x,y,z) coordinates of the voxel. A data processing system C processes the three-dimensional object data to generate a video display D in accordance with instructions input by the operator on an operator control console or system E.

With reference to FIG. 2, the video display D includes a video display screen 20 having a plurality of, e.g. four, view ports. Each view port displays an independently changeable video image. In the preferred embodiment, a first view port 22 displays a projection image depicting a projection of the imaged volume onto the video screen or viewing plane 20. The video screen or viewing plane includes a two-dimensional array of pixels defined by coordinates (i,j). A third coordinate k is defined in a direction orthogonal to the i, j-coordinates of the viewing plane. Faces 24, 26, 28 of the 3D projection image are "distorted" to give visual cues indicative of the depth or distance along the k-axis between the viewing screen and each point on the surface. The rectangular faces in the illustrated projection image are displayed as parallelograms with the angles at the corners changed from orthogonal in proportion to the relative angular orientation or rotation of the viewing plane relative to the examined object region. The dimensions of the parallelograms are likewise foreshortened in accordance with the angular orientation or rotation. Note that if a face is orthogonal to the viewing plane, it is displayed full size with 90° corners. However, as the faces appear to become obliquely oriented toward the viewing screen, the faces are foreshortened and the change in the angles at the corners of the parallelograms becomes more pronounced.

Figure 4:
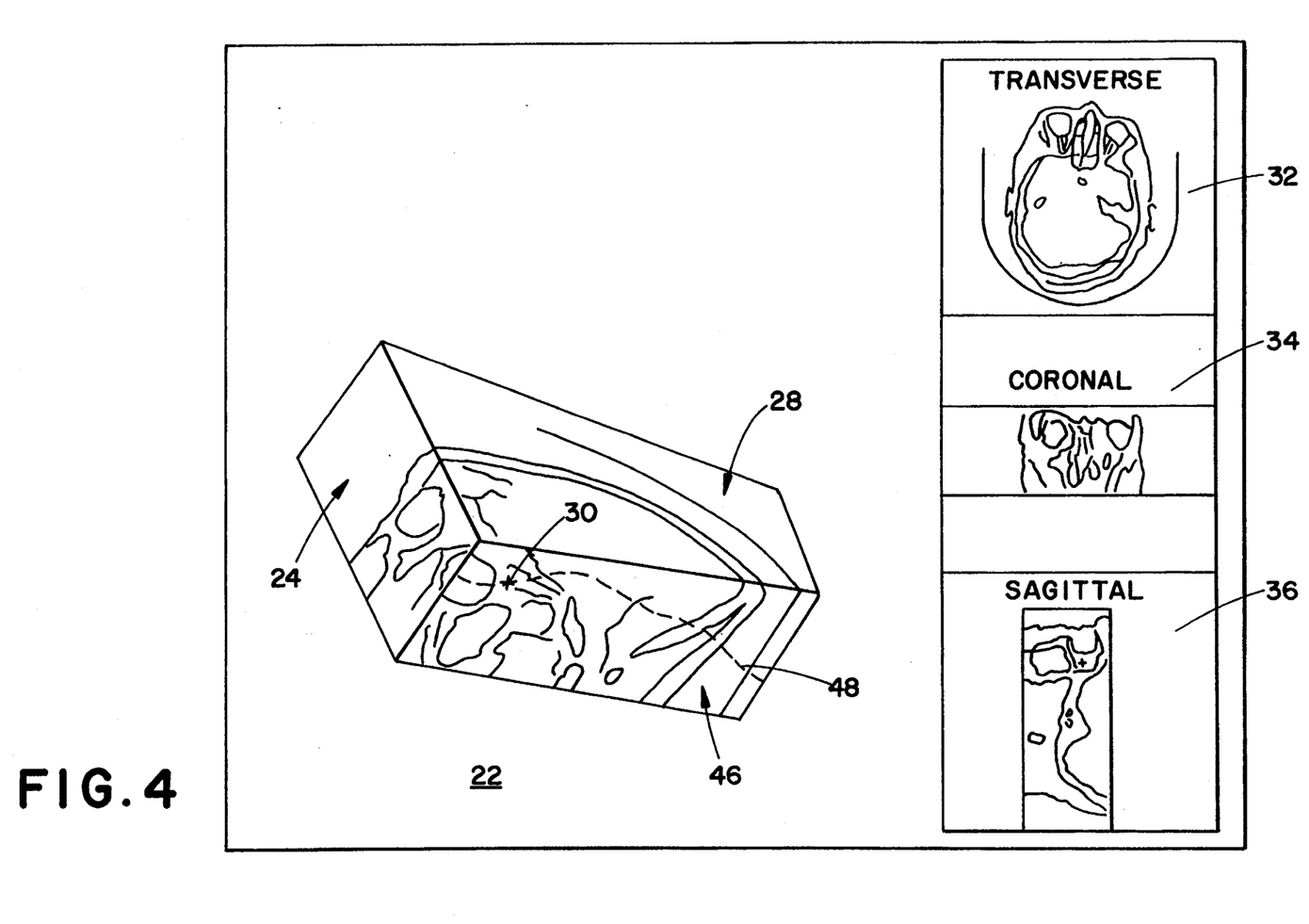
FIG. 4 is analogous to FIG. 2 but illustrates a projection view that has at least one obliquely cut surface.
Figure 5:
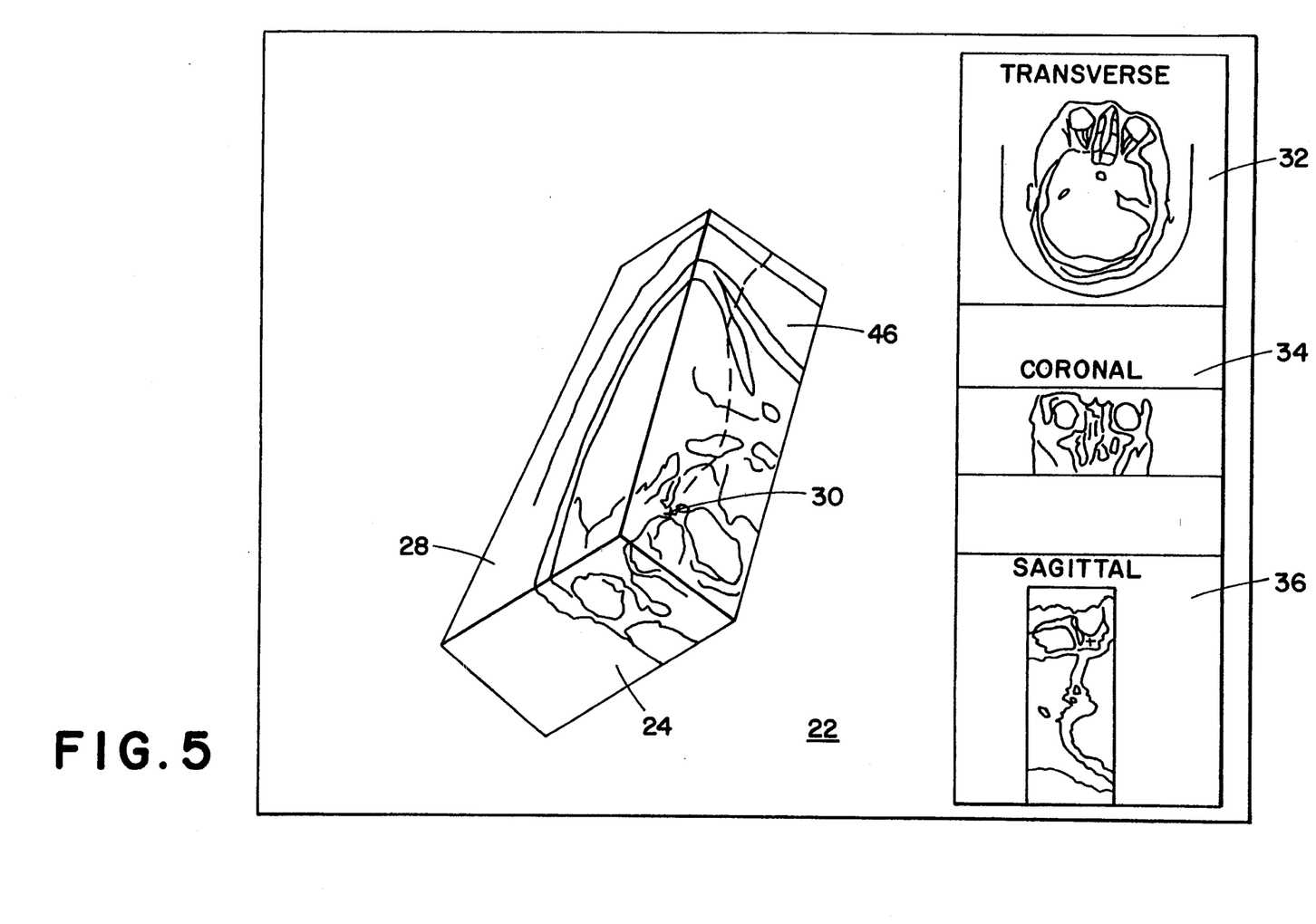
FIG. 5 is analogous to FIG. 4 but with the perspective view rotated to another viewing orientation.

With reference to FIGS. 4 and 5, the operator may conveniently position or rotate the 3D projection image with a selected apparent orientation when viewed from the viewing plane; conversely, the viewer may re-orient or rotate the viewing plane around the polyhedral imaged volume. The volume may be rotated about a selected axis to bring previously hidden faces into view.

Figure 3:
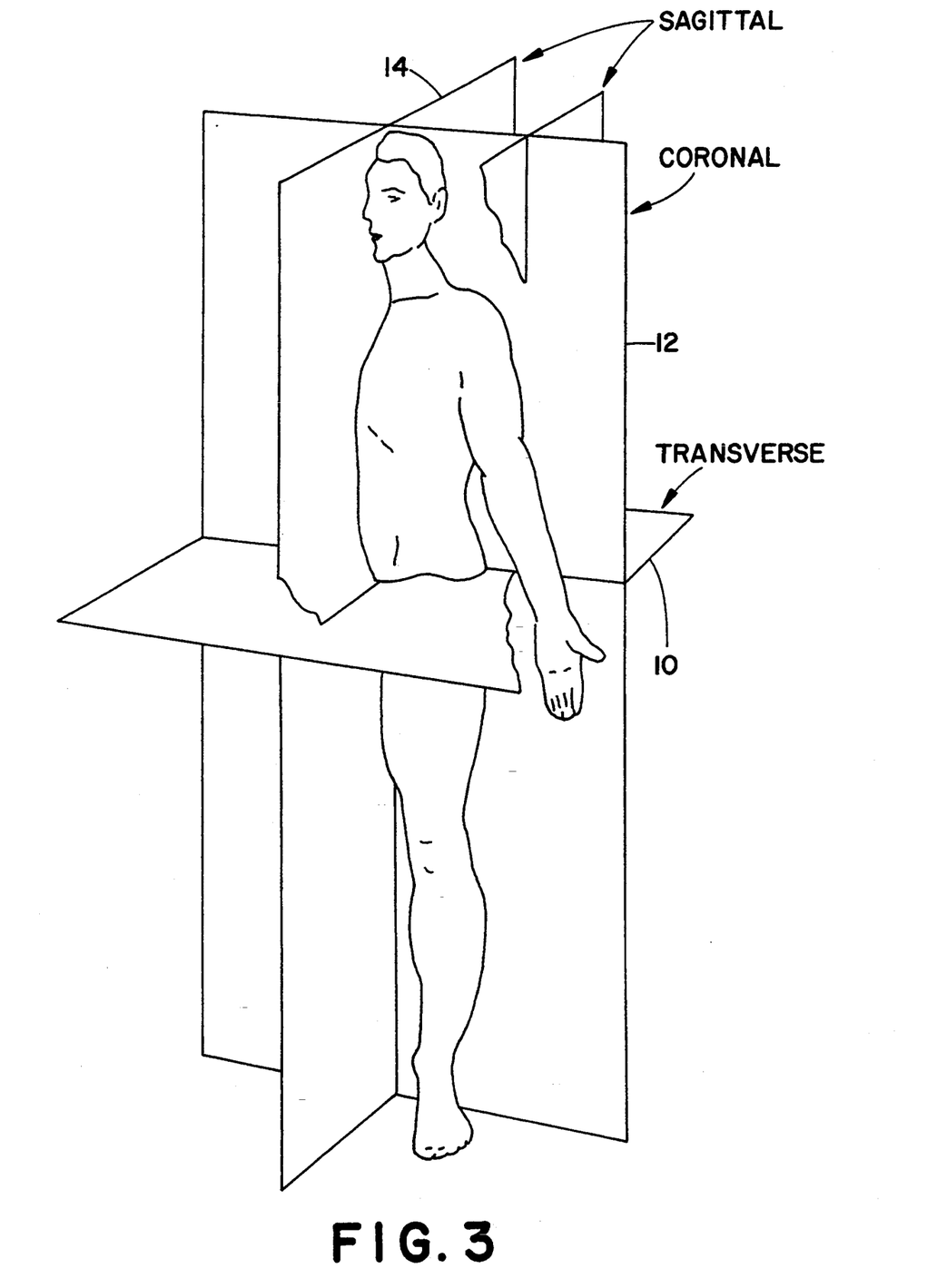
FIG. 3 is a diagrammatic explanation of the transverse, sagittal, and coronal planes relative to a human subject.

With continuing reference to FIG. 2 and further reference to FIG. 3, the operator positions a cursor 30 at a selectable location on the first view port or portion 22 of the video display D. A second view port 32 displays the data along the transverse plane 10 through the position of the cursor. In the coordinate system of FIG. 2, the transverse plane is also the (x,y) plane. In a CT scanner in which a human patient is disposed in a prone position, the transverse plane is also known as an axial plane. Because the x, y, and z-coordinates in object space are fixed, the displayed (x,y) plane is selected by adjusting the selected distance along the z-axis. A third view port 34 displays an image of the coronal plane 12, i.e. the (x,z) plane. A fourth view port 36 displays the (y,z) or sagittal plane 14 through the imaged volume which intersects the (x,y,z) position of the cursor 30.

To index through the available coronal planes, the operator moves the cursor 30 across face 24 along track 38c. By moving the cursor along track 38s, the sagittal plane is re-positioned left and right in the illustration of FIG. 2C. To index the transverse planes with the coronal and sagittal planes, the operator uses either a transverse slice selection means other than a cursor or tracks along one of paths 38t and 38t'. The examined volumetric region illustrated at FIG. 2 is through the pelvic region of the patient. The pelvic bone 40 and lumbar vertebrae 42 are visible on the surface of the projection image of the first view port 22. The operator's view of the pelvic bone, lumbar vertebrae, and other associated tissue is adjusted by moving the cursor 30 until the transverse, coronal, and sagittal images are optimized for the selected diagnostic procedure.

Of course, the examined volume may not coincide precisely with the region that the operator wants to examine. Other tissues and structures such as air and the patient couch, are commonly examined and imaged along with the patient. An editing means 44 enables the operator to make an effective removal of unwanted voxels from the examination region. Although removing a single selected voxel is conceptually simplest, the operator more typically removes or edits larger groups of voxels. As is conventional in the art, the operator may define cutting planes, either parallel to one of the transverse, coronal, or sagittal planes, or oblique cutting planes. The operator may also define curved cutting surfaces. A volumetric region edited into a polygon with at least one oblique surface is illustrated in FIGS. 4 and 5. Rather than editing voxels based on spatial location, the operator can also edit voxels based on other criteria. For example, air, soft tissue, bone, and other types of imaged subject matter have CT numbers in distinct ranges. The operator can delete all voxels with CT numbers corresponding to air, for example. As another example, the operator may choose to edit all voxels except those with CT numbers corresponding to bone. This provides a skeletal display in the projection image. As yet another option, the operator may perform a separate editing for the projection image and the three orthogonal slice images. For example, the projection image may be a tissue specific depth image with shading and the three orthogonal images can be interpolated CT number images. As another example, the projection image can be edited for tissue type to "peel away" selected tissue types, thereby providing a new surface for the cursor to traverse. This can be achieved by duplicating the object memory and accessing the memory holding data edited with one editing function for the projection image and accessing the memory edited with the other editing function to display the orthogonal slices. In this manner, the operator can display, for example, a projection view of a section of the patient's skeleton to facilitate accurate placement of the cursor while viewing images of all tissue in the orthogonal slices through the cursor position.

With reference to FIGS. 4 and 5, in many instances, the displayed projection image of the volume has one or more oblique surfaces 46. As the cursor 30 moves along an oblique surface, such as along track 48, all three of the transverse, coronal, and sagittal planes are indexed concurrently. Even after the transverse, coronal, and sagittal views are selected, the operator can rotate the viewing plane or imaged object, such as between the positions of FIGS. 4 and 5, without affecting the orientation or other aspects of the display of the transverse coronal and sagittal planes. The rotation can expose surfaces that were not previously visible.

With reference again to FIG. 1, the non-invasive examination means A, in the illustrated embodiment, is a CT scanner. However, other sources of three dimensional image data both outside the medical imaging field and in the medical imaging field, such as magnetic resonance imagers, are contemplated. The non-invasive medical diagnostic apparatus A includes an examination region 50 for receiving the subject supported on a patient couch or support 52. An irradiating means 54, such as an x-ray tube, magnets, or radio frequency coils, irradiates the patient. A radiant energy receiving means 56, such as radiation detectors, radio frequency receiving coils, or the like, receive medical diagnostically encoded radiant energy. In the illustrated CT scanner example, the source of radiant energy is an x-ray tube which generates a fan-shaped beam of x-rays. The fan-shaped beam of x-rays passes through the subject in the examination region 50 impinging upon a ring of x-ray detectors of the radiant energy detection means 56. The x-ray tube is mounted for rotation by a motor or other rotating means about the examination region such that the patient is irradiated from a multiplicity of directions. The radiation detectors are positioned either in a stationary ring surrounding the examination ring or in an arc which rotates with the x-ray tube to receive the radiation that has traversed the patient.

An image reconstruction means 58 reconstructs an image representation from the received radiation. For example, the image reconstruction means may reconstruct a 512×512 array of data values, each data value being representative of a radiation transmissive property of a corresponding voxel of the one plane or slice of the volumetric region. The patient couch is indexed axially through the examination region between scans to generate a plurality of slices of image data. Optionally, the patient couch may be translated continuously such that the x-ray beam passes through the patient along a spiral path. If spiral data is generated, a conventional, spiral data reconstruction means is utilized to convert the spiral data into data values corresponding to each of a three-dimensional orthogonal array of voxels, e.g. an x, y, z array where x, y, and z are the coordinate axes of object space. Object space is the (x,y,z) coordinate system of the patient in the scanner; whereas, image space is the (i,j, k) coordinate system of the projection image presented in the first port 22.

The data processing system C includes transform means 60 which translates, rotates, and scales coordinates, lines, curves, and surfaces from object space to image space and reversely transforms locations, lines, curves, and surfaces from image space to object space. More specifically, the affine transform is a matrix which translates coordinates or vectors x, y, z in object space to corresponding coordinates or vectors i, j, k in image space, i.e.:

$$[x, y, z] \begin{bmatrix} \text{AFFINE} \\ \text{TRANSFORM} \\ \text{MATRIX} \end{bmatrix} = [i, j, k]. \quad (1)$$

Conversely, the reverse of the affine transform matrix converts coordinates or vectors in image space to corresponding coordinates or vectors in object space, i.e.:

$$[i, j, k] \begin{bmatrix} \text{REVERSE} \\ \text{AFFINE} \\ \text{MATRIX} \end{bmatrix} = [x, y, z]. \quad (2)$$

The k-coordinate of the projection image is uniquely defined by the i, j-coordinate. For example, the planes of the polyhedral volumetric region are mathematically defined in the process of editing the data or otherwise preparing the data for display. Accordingly, the k value can be retrieved from a look-up table or otherwise uniquely calculated from this a priori information. When the viewing angle is changed, the values of the transform matrix are modified in accordance with trigonometric functions of the angle of rotation.

The operator control means E includes a mouse, trackball, or other angular orientation input means $62_{\theta x}$, $62_{\theta y}$, and $62_{74 \, z}$ for inputting a degree of rotation of the viewing angle about the x, y, and z-axes to rotate the 3D projection image as illustrated by way of example in FIGS. 2—4. Viewing angle buffers $64_{\theta x}$, $64_{\theta y}$, and $64_{\theta z}$ store the selected viewing angle. A one-dimensional joystick or other scale input means 66 controls enlargement and reduction of the viewed 3D volume image. A scale or magnification buffer 68 stores the selected scale factor. Optionally, other controls may be provided for translating the viewed 3D volume projection image.

The affine transform means 60 adds the indicated x, y, and z-translation factors, multiplies the length and angle of the polyhedral faces from the volume space by sine and cosine values of the indicated rotation angles, and multiplies the dimensions by the scale factor. An image space memory means 70 stores the transformed face polygons and a grid indicative of the (i,j) pixel locations on the video display D. A data retrieval means 72 identifies each pixel location which falls within one of the polygonal faces and determines its location relative to that polygon.

A depth from the viewing plane determining means 74 determines a depth or distance k in the viewing direction from the viewing plane to a point of intersection with a viewed voxel of the imaged volume. More specifically, the depth determining means 74 determines the distance from the cursor pixel of the viewing plane to a point of intersection with the underlying face. The depth may be determined, for example, from a look-up table addressed by (i,j), by the conventional ray tracing technique in which a length of a ray projected in the viewing direction from the corresponding pixel of the viewing plane to a point of intersection with the object is determined, or the like. It is to be appreciated, that the point of intersection need not be on the surface 26. As indicated above, some voxels of the object may be given a value which renders them invisible to the viewer. For example, only data values within object space which have a CT number corresponding to a selected tissue type, such as bone, may be displayed in a surface rendered image based on a depth image. In this 3D appliation, 3D tissue surfaces are created by allowing the operator to select a tissue type such as bone, and then other tissue types are segmented out. In this 3D technique, the depth from the screen to the surface is commonly looked-up from a visible surface memory buffer, or is determined with a suitable ray tracing technique. Data values corresponding to air and other tissue types are set to zero, or another value which indicates that they are not displayed. As the cursor 30 moves across the patient's face, such as across the patient's nose, the depth from the viewing plane to the viewable voxels changes, causing a corresponding change in the location of the transverse plane. If the cursor moves obliquely across face 24 as well, all three displayed planes change concurrently.

The data retrieval means 72 accesses the transform means 60 and the depth means 74 to cause the image space pixel locations to be transformed with the reverse of the transform indicated by the buffers 64, 68. The reverse transform of the (i,j,k) pixel location provides a corresponding (x,y,z) coordinate in object space. A memory access means 76 uses the object space coordinates to retrieve the corresponding data values from the object memory B.

Although reversely transformed coordinates of the 3D projection image can fall directly on voxels of object space, the coordinates in many instances will fall in between. To this end, an interpolating means 80 interpolates the data values corresponding to the two, four, or eight closest voxels to the reversely transformed coordinates, in inverse proportion to the relative proximity.

The retrieved, interpolated values from the object memory B are converted by a video processor 82 into a video display on a video display means D. If the video processor can generate images with more than one pixel format, it is connected with the image space memory 70 for supplying an indication of the selected pixel grid. Optionally, a video memory 84 may be provided. The video memory has a first portion 86 corresponding to the first video port into which the data for the projection image is loaded. The video processor 82 then converts the data from the video memory into a video signal to drive the video display.

The operator control panel E further includes a cursor positioning means 90, such as a mouse or trackball for indicating the (i,j) location of the cursor relative to the projection image. A cursor image control means 92 is connected between the cursor positioning means and the video processor 82 to cause the cursor 30, such as a crosshair, to be displayed at the selected (i,j) coordinates indicated by the cursor positioning means. Optionally, the transverse (or other) slice may be selected by a z- (or other) axis control 94 including associated circuitry or buffers 96. As the z-control is indexed, slices on the front face 24 of the displayed three-dimensional object are "peeled away". That is, the displayed front face is removed and the next plane down becomes the frontmost face of the volumetric region. This process is repeated until a selected transverse plane is reached. The cursor control 90 increments the i and j-coordinates of the cursor crosshair, causing the crosshair to be shifted vertically and horizontally across the video display. The k-coordinate is selected either from the depth measuring means 74 or the z-control 94.

The i, j, and k-coordinate corresponding to the cursor is conveyed to the transform means 60 which performs a reverse of the selected transform on cursor location to transform it from image space to the corresponding x, y, z-coordinate of object space.

Figure 2A:
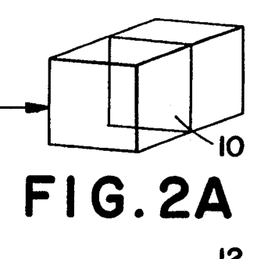
FIG. 2A illustrates a transverse plane through the volumetric region.

A transverse or (x,y) plane defining means 100 converts the designated (x,y,z) coordinate into an identification of the transverse or (x,y) plane. As illustrated in FIG. 2A, the transverse or (x,y) plane has a fixed orientation in object space. Only the z-location in object space is necessary to identify the (x,y) plane. A coronal or (x,z) plane defining means 102 defines the addresses of the selected coronal plane in the object memory B.

Figure 2B:
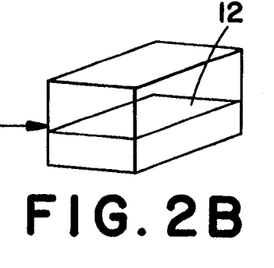
FIG. 2B illustrates a coronal plane through the volumetric region.
Figure 2C:
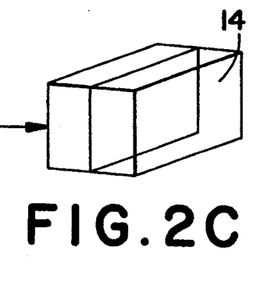
FIG. 2C illustrates a sagittal plane through the volumetric region.

Again, as illustrated in FIG. 2B, because the orientation of the coronal cursor coordinate in object space is fixed, the position of the plane along the y-axis determines the coronal plane. Analogously, a sagittal or (y,z) plane defining means 104 converts the received cursor coordinates into the appropriate addresses in the object memory for the sagittal plane. The CT or other data values at the addresses for the transverse, coronal, and sagittal planes are fed to corresponding subregions 110, 112, 114, respectively, of the video memory 84. In this manner, by moving the (i,j) cursor position selector 90 or the z-input control 94, one or more of the planes is redefined and the new data values are loaded immediately into the video memory and supplied to the video processor.

In the preferred embodiment, the reversely transformed cursor coordinates are also supplied to a second cursor image control means 116 which causes the video processor to generate a crosshair or other cursor indicator 118 on each of the transverse, coronal, and sagittal images at a display location corresponding to the cursor coordinate, hence corresponding to the cursor in the projection image in the first video port 22.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A CT scanner system comprising:
   a source of radiation for irradiating an examination region from a plurality of directions;
   a radiation detection means disposed across the examination region from the radiation source for receiving radiation that has traversed the examination region;
   an examined object support means for supporting and moving an object axially through the examination region such that a volumetric region of the object is examined;
   a reconstruction means for reconstructing data values representing voxels of the volumetric region;
   an object memory means for storing the data values from the reconstruction means;
   a transform means for transforming polygonal surfaces of the volumetric region into transformed polygonal surfaces on a viewing plane which transformed polygonal surfaces represent projections of the volumetric region polygonal surfaces on the viewing plane and for reversely transforming locations on the viewing plane into corresponding coordinates in the volumetric region;
   a two-dimensional display means for generating a two-dimensional human-readable display corresponding to the viewing plane, the human-readable display including a two-dimensional array of pixels, the transforming means reversely transforming the locations of the pixels into corresponding coordinates of the volumetric region;
   an image processor means for converting the data values corresponding to the reversely transformed pixel coordinates into image values displayed at the corresponding pixels of the two-dimensional display means;
   a cursor positioning means for selecting a location on the two-dimensional display at which a cursor is displayed, the cursor positioning means being operatively connected with the image processor means for causing the cursor to be displayed at the selected cursor location and with the transform means for reversely transforming the selected cursor location to a corresponding cursor coordinate in the volumetric region;
   a plane defining means operatively connected with the transform means for defining at least two of transverse, coronal, and sagittal planes through the volumetric region which intersect at the reversely transformed cursor coordinate, the data values corresponding to the defined planes being supplied to the image processor means which converts the data values corresponding to the defined planes into image values which are displayed on the two-dimensional display means, whereby human-readable images of a projection view of the volumetric region and at least two of intersecting transverse, coronal, and sagittal planes are displayed concurrently, the human-readable images of the planes changing substantially in real time as the cursor positioning means moves the cursor.

2. An image display system comprising:
   an object memory means for storing data values from a three-dimensional image data source representing voxels of a three-dimensional volumetric region;
   a transform means for transforming polygonal surfaces of the volumetric region into transformed polygonal surfaces on a viewing plane which transformed polygonal surfaces represent projections of the volumetric region polygonal surfaces on the viewing plane and for reversely transforming locations on the viewing plane into corresponding coordinates in the volumetric region;
   a two-dimensional display means for generating a two-dimensional human-readable display corresponding to the viewing plane, the human-readable display including a two-dimensional array of pixels, the transforming means reversely transforming the locations of the pixels into corresponding image pixel coordinates of the volumetric region;
   an image processor means for converting the data values corresponding to the reversely transformed image pixel coordinates into image values displayed at the corresponding pixels of the two-dimensional display means;
   a cursor positioning means for selecting a location on the two-dimensional display at which a cursor is displayed, the cursor positioning means being operatively connected with the image processor means for causing the cursor to be displayed at the selected location and with the transform means for reversely transforming the selected cursor location to a corresponding cursor coordinate in the volumetric region;
   a plane defining means operatively connected with the transform means for defining at least two planes through the volumetric region which intersect at the reversely transformed cursor coordinate, data values corresponding to the defined planes being supplied to the image processor means which converts the data values corresponding to the defined planes into image values which are displayed on the two-dimensional display means, whereby human-readable images of a projection view of the volumetric region and at least two intersecting planes in the volumetric region are displayed concurrently with the human-readable images of the planes changing as the cursor positioning means moves the cursor.

3. The system as set forth in claim 2 further including an operator controlled transform control means operatively connected with the transform means for selectively adjusting a spatial relationship between the volumetric region and the viewing plane.

4. The system as set forth in claim 3 wherein the operator controlled transform control means includes an operator controlled viewing angle rotation means for selectively rotating an angle from which the viewing plane views the volumetric region, the viewing angle control means being operatively connected with the transform means for adjusting the transform in accordance with changes in the selected viewing angle.

5. The system as set forth in claim 4 wherein the transform control means includes a scaling means for selectively enlarging and diminishing the displayed two-dimensional image representation by a scaling factor, the scaling means being operatively connected with the transform means for adjusting the transform in accordance with the scaling factor.

6. The system as set forth in claim 2 wherein the three-dimensional image data source includes a CT scanner.

7. The system as set forth in claim 6 further including:
an axial position indicating means for indicating positions along an axial direction of the CT scanner; and,
wherein the cursor positioning means includes means for selecting horizontal and vertical positions along the two-dimensional display, the axial position indicating means and the cursor positioning means being connected with the transform means such that the indicated axial position and the indicated horizontal and vertical positions are reverse transformed into the cursor coordinate supplied to the plane defining means.

8. The system as set forth in claim 7 wherein the plane defining means includes a transverse plane defining means for defining a transverse plane orthogonal to the axial direction through the cursor coordinate, a sagittal plane defining means for defining a sagittal plane orthogonal to the transverse plane through the cursor coordinate, and a coronal plane defining means for defining a coronal plane orthogonal to the transverse and sagittal planes through the cursor coordinate.

9. The system as set forth in claim 8 further including a display memory means having a first memory portion for storing image values corresponding to the projection image representation, a second memory portion for storing the values from the object memory means corresponding to the defined transverse plane, a third memory portion for storing the data from the object memory means corresponding to the defined coronal plane, and a fourth memory portion for storing values corresponding to the defined sagittal plane, portions of the display memory means being updated as the cursor is moved, the image processor being connected with the display memory means.

10. The system as set forth in claim 2 further including a depth determining means for determining a relative depth in a viewing direction from the selected cursor location to a point of intersection of a ray extending through the selected cursor location in the viewing direction and a viewed voxel of the volumetric region, the depth defining means being operatively connected with the transform means such that the transform means transforms the selected location of the cursor on the display and the determined relative depth into the reversely transformed cursor coordinate.

11. In an image display system which includes an object memory for storing data values representing voxels of a three-dimensional volumetric region, a transform means for transforming voxel coordinates of the volumetric region which define polygonal surfaces into transformed polygonal surfaces on a viewing plane, which transformed polygonal surfaces represent projections of the volumetric region polygonal surfaces onto the viewing plane and for reversely transforming locations on the viewing plane into corresponding voxel coordinates in the volumetric region, a two-dimensional display means for generating a two-dimensional human-readable display, the human-readable display including a two-dimensional array of pixels, the transforming means reversely transforming locations of the pixels on the view plane into corresponding pixel coordinates in the volumetric region, and an image processor means for converting the data values corresponding to the reversely transformed pixel coordinates into image values for display at the corresponding pixels of the two-dimensional display means, the improvement comprising:
a cursor positioning means for selecting a location on the two-channel display at which a cursor is displayed, the cursor positioning means being operatively connected with the image processor means for causing the cursor to be displayed at the selected location on the two-dimensional display and being operatively connected with the transform means for reversely transforming the selected cursor location to a corresponding cursor coordinate in the volumetric region;
a plane defining means operatively connected with the transform means for defining at least two planes through the volumetric region, which planes intersect at the cursor coordinate, the data values corresponding to the defined planes being supplied to the image processor means to be converted into the image values which are displayed on the display means.

12. In the system set forth in claim 11, the improvement further comprising:
an axial position indicating means for selecting positions along a first axis, which first axis extends away from the viewing plane; and,
wherein the cursor positioning means includes a means for selecting horizontal and vertical positions along the two-dimensional display, the axial position indicating means and the cursor positioning means being connected with the transform means such that the indicated axial position and the indicated horizontal and vertical display positions are reversely transformed into the cursor coordinate.

13. In the system as set forth in claim 12, the improvement further comprising the plane defining means including:
a transverse plane defining means for defining a transverse plane through the cursor coordinate;
a coronal plane defining means for defining a coronal plane orthogonal to the transverse plane through the cursor coordinate; and, a sagittal plane defining means for defining a sagittal plane orthogonal to the transverse and coronal planes through the cursor coordinate.

14. In the system as set forth in claim 13, the improvement further comprising a means for supplying the cursor coordinate to the image processor means such that a cursor indication is superimposed on the two-dimensional display of the transverse, coronal, and sagittal planes.

15. A method of concurrently displaying a projection image of a volumetric region and at least two intersecting planes through the volumetric region, the method comprising:

displaying the projection image on a portion of a two-dimensional display means;

displaying a cursor at a selected location on the projection image;

transforming the selected cursor location into a corresponding cursor coordinate of the volumetric region;

defining a first plane through the volumetric region which intersects the cursor coordinate;

defining a second plane through the volumetric region which intersects the first plane and the cursor coordinate;

generating a display of data values corresponding to the first plane in a second portion of the two-dimensional display means;

generating a display of the data values corresponding to the second plane in a third region of the display means.

16. The method as set forth in claim 15 further including moving the location of the cursor on the projection image such that the transforming step transforming the moved cursor location into a new cursor coordinate as the cursor is moved, and the plane defining step redefining the planes as the cursor coordinate is changed, whereby the displayed planes are updated by re-slicing the volume according to the position of the cursor.

17. The method as set forth in claim 16 further including defining a third plane through the cursor coordinate.

18. The method as set forth in claim 17, wherein the first, second, and third planes are orthogonal to each other.

19. The method as set forth in claim 17, further including converting the cursor location into a human-readable display on the two-dimensional display means.

20. The method as set forth in claim 17 wherein the two-dimensional display means is a single video monitor and wherein the display step includes converting the data values into a video signal.

* * * * *